G. ANDERSON.
SLED RUNNER ATTACHMENT.
APPLICATION FILED MAY 3, 1916.
1,199,958.
Patented Oct. 3, 1916.
3 SHEETS—SHEET 1.
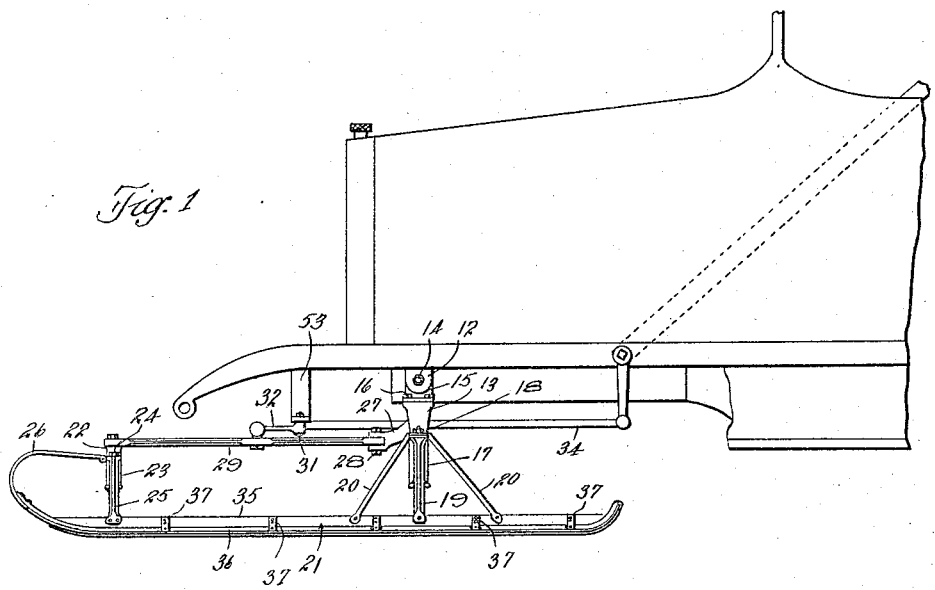
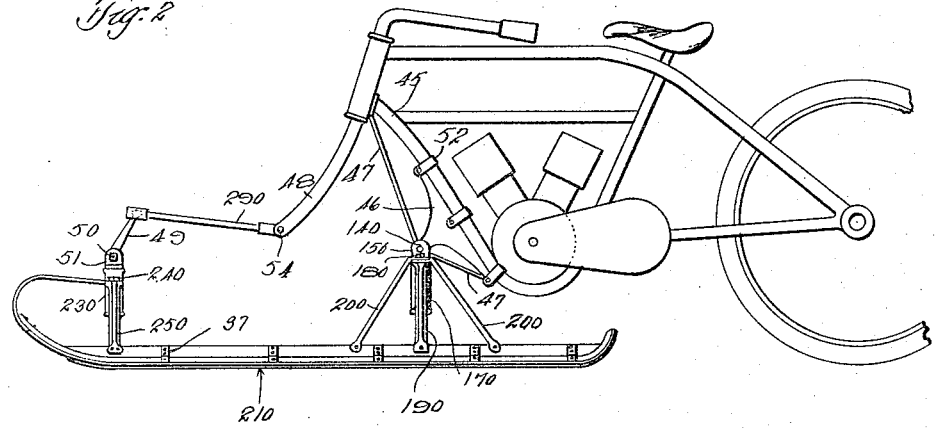
Inventor
Guy Anderson
By
Attorneys G. ANDERSON.
SLED RUNNER ATTACHMENT.
APPLICATION FILED MAY 3, 1916.
1,199,958.
Patented Oct. 3, 1916.
3 SHEETS—SHEET 2.
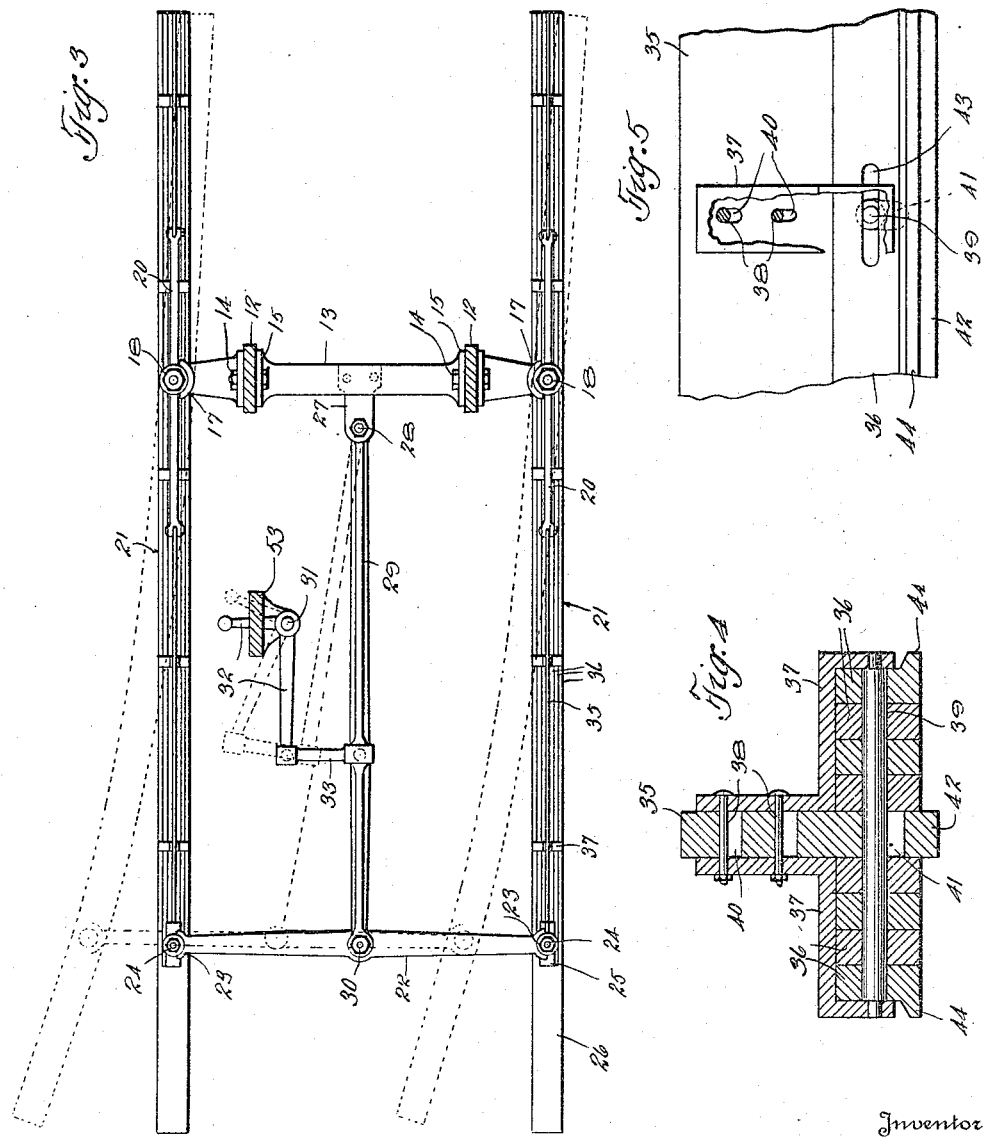
Inventor
Guy Anderson
Attorneys

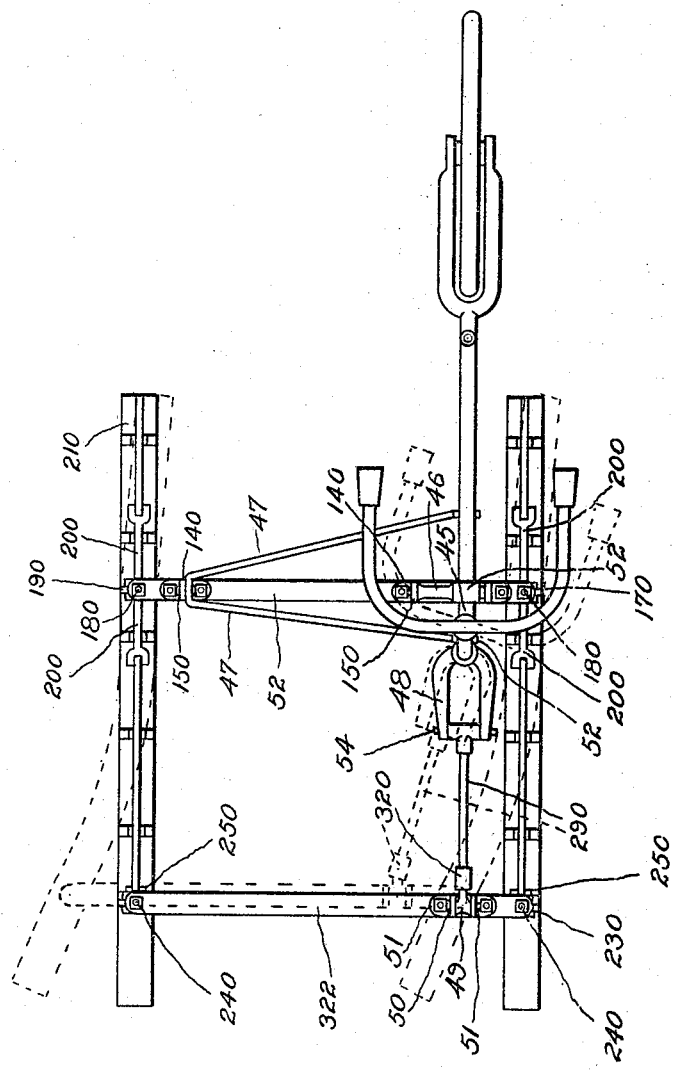

UNITED STATES PATENT OFFICE.

GUY ANDERSON, OF HAYNESVILLE, MAINE.

SLED-RUNNER ATTACHMENT.

1,199,958.      Specification of Letters Patent.      Patented Oct. 3, 1916.

Application filed May 3, 1916. Serial No. 95,099.

*To all whom it may concern:*

Be it known that I, GUY ANDERSON, a citizen of the United States, residing at Haynesville, in the county of Aroostook and State of Maine, have invented or discovered certain new and useful Improvements in Sled-Runner Attachments, of which the following is a specification, reference being had therein to the accompanying drawings.

This invention relates to sled runners applicable to sleds and the like generally but more particularly designed for use in connection with automobiles, motor cycles, and other self-propelled vehicles.

The invention has for one object the provision of a sled runner attachment for automobiles and similar vehicles in which the runner or runners may be simultaneously turned and laterally flexed, preferably by means of the regular steering mechanism of the vehicle, providing for easy, accurate, and reliable steering of the vehicle, when running over snow or ice, without danger of skidding.

Further objects of the invention are the provision of a sled runner having a broad bearing face which enables the same to run easily over soft snow, one which, notwithstanding its breadth or lateral thickness, may be easily flexed or bent laterally for steering purposes, and one in which danger of skidding is eliminated.

The foregoing and other objects of the invention, together with means whereby the same may be carried into effect, will best be understood from the following description of certain forms or embodiments thereof illustrated in the accompanying drawings. It will be understood, however, that the particular constructions described and shown have been chosen for illustrative purposes merely, and that the invention, as defined by the claims hereunto appended, may be otherwise practised without departing from the spirit and scope thereof.

In said drawings: Figure 1 is a side elevation of the front part of an automobile having applied thereto a sled runner attachment constructed and arranged in accordance with the invention. Fig. 2 is a similar view of a motor cycle equipped with a modified form of the invention. Fig. 3 is an enlarged plan view of the runner attachment shown in Fig. 1. Fig. 4 is a still further enlarged transverse section of one of the runners. Fig. 5 is an enlarged detail elevation, partly broken away, of a portion of one of the runners. Fig. 6 is a plan view of the construction shown in Fig. 2.

Referring to Figs 1 and 3, 12 denotes brackets bolted or otherwise secured to suitable portions of the automobile frame adjacent opposite sides of the latter, said brackets supporting a transverse bar 13 by means of pivot bolts 14 passing through said brackets and through ears 15 projecting from said bar 13. Said ears 15 may be formed integral with the bar 13 and arranged in pairs at opposite sides of the brackets 12, as shown in Fig. 3, or, as shown in Fig. 1, there may be provided one ear 15 for each of the brackets 12 formed separate from the bar 13 and secured thereto by bolts 16. At its opposite ends the bar 13 is provided with depending arms or steering knuckles 17 to which are pivoted, by bolts or pins 18, runner knees or uprights each comprising a knuckle bracket 19 and a pair of braces 20, said bracket and braces being bolted or otherwise secured at their lower ends to the runners, designated as a whole by the numeral 21.

In the construction shown in Figs. 1 and 3, two parallel runners are provided, said runners being connected adjacent their forward ends by a bar 22 having at its ends depending arms or knuckles 23 to which are pivoted, by means of bolts or pins 24, upright arms or brackets 25 bolted or otherwise secured at their lower ends to the runners 21. Carried by the cross bar 13, and extending forwardly therefrom, is a bracket 27, to the forward end of which is pivoted, at 28, the rear end of a steering bar 29, pivoted at its forward end, as at 30, to the bar 22. By this construction, and for a purpose hereinafter explained, the axis of the pivot 28 is located a considerable distance forward of the line connecting the pivotal axes 18 of the runners 21. Pivoted at 31 to a bracket 53 or other suitable support on the vehicle frame, is a bell crank lever 32, one arm of which is connected by a link 33 to the rod 29, and the other arm of which is connected with the rod 34 forming a portion of the regular steering mechanism of the car.

Referring particularly to Figs. 4 and 5, each of the runners 21 comprises a supporting member 35, to which the lower ends of the brackets 19 and 25 and braces 20 are secured, a bearing member comprising a series of strips 36, and brackets 37 connecting the supporting and bearing members and secured thereto by pins or bolts 38 and 39. The supporting member 35 comprises an upright strip, preferably of spring steel, and provided with vertical slots 40 to receive the bolts 38 and vertical slots 41 to receive the pins or bolts 39. The brackets 37 are of angular form and comprise inner and upper vertical portions which engage the lateral faces of the supporting member 35 and receive the ends of the bolts 38, horizontal portions overlying the strips 36, and outer and lower vertical portions which engage the outer faces of the outermost strips 36 and receive the shouldered ends of the pins or bolts 39. The strips 36, which are preferably composed of spring steel, are flat and vertically disposed, are arranged side by side, transversely of the runner, and extend longitudinally thereof. The forward ends of the strips 36 of each runner are slightly upturned and riveted or otherwise secured to a strap 26 which is curved upwardly and backwardly and secured to the corresponding arm or bracket 25, said strap constituting a runner nose. The strips 36 may be of any suitable number, depending upon the breadth of runner desired, and collectively provide a broad lower bearing face capable of running over soft snow without cutting into the same to an objectionable extent. Preferably said strips are arranged in two groups or sections at opposite sides of the supporting member 35, the brackets 37 being arranged in corresponding pairs. Said supporting member preferably projects for a short distance below the bearing face of the strips 36 to provide a substantially central fin or blade 42 adapted to cut into the snow or ice and resist lateral skidding. By loosening the bolts 38 the supporting member 35 may be adjusted vertically with respect to the other parts of the runner, the bolts 38 and 39 moving in the slots 40 and 41, respectively, thereby varying the effective depth of the fin or blade 42 in accordance with the requirements. The strips 36 are provided with longitudinal slots 43 which receive the pins or bolts 39 and which may, if desired, be of progressively increasing length from the forward to the rear end of the runner. By this construction independent longitudinal movement of the several strips 36 is permitted, so that the runner as a whole, notwithstanding its breadth, is rendered laterally flexible. If desired, the outermost strips 36 of each series may be provided at their lower outer edges with flanges 44, substantially equal in breadth to the thickness of the brackets 37, in order further to increase the width of the bearing surface.

The steering operation is as follows, reference being had to Fig. 3: When the steering rod 29 is swung about its pivot 28 by the lever 32 and steering mechanism, the runners 21 are caused to swing, substantially in parallelism, about their pivots 18. As above stated, however, the pivotal axis 28 of the steering rod 29 is located in advance of the pivotal axes 18 of the runners, so that the radius 28—30 is shorter than the radii 18—24. The curvature of the arc through which the point 30 moves, and whose center is at 28, is therefore greater than that of the arcs whose centers are at 18 and through which the points 24 tend to move, so that, for a given lateral displacement, the point 30 tends to move a greater distance longitudinally than do the points 24. The relative position of the points 24 and 30 is, however, fixed by the rigid bar 22, as is also the relative position of the points 30 and 28 by the rigid steering rod 29. Swinging of said steering rod on its pivot 28, therefore, causes a shortening of the distance between the bars 13 and 22 by a greater amount than would normally be caused by the swinging of the runners 21 about their pivots 18, so that the distances between the pivots 18 and 24 are correspondingly shortened, and the runners 21 caused to bend laterally, as shown in dotted lines in Fig. 3. It will accordingly be seen that means are provided for simultaneously swinging the runners upon their pivots and flexing them laterally, and this combined operation is found to result in easier and more efficient steering than can be accomplished by either swinging or flexing of the runners alone.

In Figs. 2 and 6 is shown a form of runner attachment suitable for use in connection with motorcycles. This attachment comprises a bracket 46 secured, as by straps or clamps 52, to the lower forward member 45 of the motorcycle frame, and provided with laterally extending braces 47. Pivotally connected at 140 to the bracket 46 and braces 47 are ears 150 on a bar 52 connecting a pair of knuckles 170 pivotally connected by bolts 180 to the runner knees or uprights, the latter each comprising an arm or bracket 190 and braces 200 secured at their lower ends to the corresponding runner 210. The runners 210 may be substantially similar in construction to the runners 21 in the form of the invention first described. Secured to the runners 210 adjacent their forward ends are upright arms or brackets 250 pivotally connected respectively, as by bolts 240, to a pair of knuckles 230 connected by a cross bar 322. Pivotally connected at 54 to the front fork of the motorcycle is a steering rod 290, connected at its forward end to the bar 322 by means of a connecting rod 49 pivoted at 50 to an ear 51 on said bar. In this construction, as in the construction first described, it will be seen that, when the fork 48 is turned for the purpose of steering, the steering rod 290 is swung about an axis in advance of the axis 180 about which the runners turn, so that said runners are laterally flexed as well as being laterally turned, as above explained.

Having thus described my invention I claim and desire to secure by Letters Patent:—

1. In a sled or the like, the combination with a pivoted and laterally flexible runner, of means for simultaneously turning said runner on its pivot and laterally flexing the same.

2. In a sled or the like, the combination with a pivoted and laterally flexible runner, of a steering rod pivoted to swing about a center in advance of the runner pivot and operatively connected with the forward end of said runner.

3. In a sled runner attachment for motor vehicles, in combination, a vehicle body, a pair of parallel, laterally flexible runners pivotally connected with said body, a steering rod pivotally connected with said body at a point out of alinement with the runner pivots, and a steering bar pivotally connected with said runners and with said rod.

4. A sled runner consisting of a supporting member provided with vertical slots, a bearing member having a relatively broad lower bearing face and comprising two sections arranged at opposite sides of said bearing member, and bolts connecting said sections with each other and passing through said slots for adjustably securing said sections to said supporting member with the lower edge of the latter projecting below said bearing face.

5. A sled runner comprising a longitudinally extending supporting member, a bearing member composed of a series of strips arranged side by side transversely of said runner and extending longitudinally thereof parallel to said supporting member, and brackets connecting said bearing and supporting members.

6. A sled runner comprising a longitudinally extending supporting member, a bearing member composed of a series of strips arranged side by side transversely of said runner and extending longitudinally thereof parallel to said supporting member, said strips collectively providing a relatively broad lower bearing face, and said supporting member projecting below said bearing face to form a skid resisting fin or blade, and brackets connecting said bearing and supporting members and adjustably connected to one of said parts, whereby the effective depth of said fin or blade may be varied.

7. A sled runner having a bearing member composed of a series of laterally flexible strips arranged side by side transversely of said runner and extending longitudinally thereof, said strips having longitudinal slots, and a pin or bolt connecting said strips and passing through said slots.

8. A sled runner comprising a longitudinally extending supporting member, a bearing member composed of a series of laterally flexible strips arranged side by side transversely of said runner and extending longitudinally thereof parallel to said supporting member, said strips having longitudinal slots, a bracket secured to said supporting member, and a pin or bolt connecting said bracket and supporting member and passing through said slots.

9. A sled runner consisting of a longitudinally extending supporting member provided with vertical slots, a bearing member composed of a series of laterally flexible strips arranged side by side transversely of said runner and extending longitudinally thereof parallel to said supporting member, said strips collectively providing a relatively broad lower bearing face, being arranged in two groups or sections located at opposite sides of said bearing member, and being provided with longitudinal slots, and said supporting member projecting below said bearing face to form a central skid-resisting fin or blade, brackets arranged at opposite sides of said supporting member, bolts connecting said brackets with each other and passing through vertical slots in said supporting member, and other bolts or pins also connecting said brackets with each other and passing through slots in both said supporting member and said strips.

In testimony whereof I affix my signature.

GUY ANDERSON.